US010808436B2

(12) United States Patent
Cuddihy et al.

(10) Patent No.: US 10,808,436 B2
(45) Date of Patent: Oct. 20, 2020

(54) REMOTE SECONDARY HOOD LATCH RELEASE

(71) Applicant: FORD GLOBAL TECHNOLOGIES, LLC, Dearborn, MI (US)

(72) Inventors: Mark A. Cuddihy, New Boston, MI (US); Hubert Szawarski, Waterford, MI (US); Tyler Glenn, Ypsilanti, MI (US); Manoharprasad K. Rao, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1044 days.

(21) Appl. No.: 15/263,738

(22) Filed: Sep. 13, 2016

(65) Prior Publication Data
US 2018/0073286 A1 Mar. 15, 2018

(51) Int. Cl.
E05B 83/24 (2014.01)
B62D 25/12 (2006.01)
(Continued)

(52) U.S. Cl.
CPC .............. E05B 83/24 (2013.01); B62D 25/12 (2013.01); E05B 81/58 (2013.01); E05B 81/08 (2013.01);
(Continued)

(58) Field of Classification Search
CPC .......... E05B 81/08; E05B 81/14; E05B 81/18; E05B 81/58; E05B 81/60; E05B 81/56;
(Continued)

(56) References Cited

U.S. PATENT DOCUMENTS 3,397,906 A  8/1968 Beckman et al.
3,731,963 A * 5/1973 Pond ................. E05B 83/24
                                                 292/144
(Continued)

FOREIGN PATENT DOCUMENTS

CN      1415834 A    5/2003
CN      102966278    3/2013
(Continued)

OTHER PUBLICATIONS

Machine Translation of KR 200482685 A, 2020, pp. 1-6 (Year: 2020).*

(Continued)

Primary Examiner — Christine M Mills
(74) Attorney, Agent, or Firm — David Coppiellie; Price Heneveld LLP

(57) ABSTRACT

A motor vehicle secondary hood latch release mechanism comprises a striker, a primary hood latch, and a secondary hood latch. A remote secondary hood latch release device actuates the secondary hood latch only after a primary hood latch switch provides a signal to the controller indicating that the primary hood latch is in the disengaged position. A hood sensor provides a signal when the hood has been lifted to the open condition. The controller actuates the secondary hood latch to the disengaged position for a prescribed period of time upon actuation of a vehicle system input device, and thereafter the controller actuates the secondary hood latch to the engaged position upon the earlier of expiration of the prescribed time or the hood sensor providing the signal to the controller that the hood has been lifted to the open condition.

19 Claims, 7 Drawing Sheets

(51) Int. Cl.
*E05B 81/58* (2014.01)
*E05B 81/08* (2014.01)
*E05B 81/56* (2014.01)
*E05B 81/70* (2014.01)
*E05B 81/72* (2014.01)

(52) U.S. Cl.
CPC .............. *E05B 81/56* (2013.01); *E05B 81/70* (2013.01); *E05B 81/72* (2013.01)

(58) Field of Classification Search
CPC .......... E05B 81/62; E05B 81/64; E05B 81/66; E05B 81/70; E05B 81/72; E05B 83/24; B62D 25/12; B62D 25/10; B62D 25/105; Y10S 292/23; Y10S 292/14; Y10S 292/42; Y10S 292/43; Y10T 292/1082; Y10T 292/1047
USPC .. 292/201, 216, DIG. 23, DIG. 14, DIG. 42, 292/DIG. 43; 296/193.11
See application file for complete search history.

(56) References Cited

U.S. PATENT DOCUMENTS

| | | | |
|---|---|---|---|
| 3,871,474 A * | 3/1975 | Tomlinson | E05B 77/48 180/273 |
| 3,966,244 A | 6/1976 | Kleisser et al. | |
| 4,382,482 A | 5/1983 | Brandi et al. | |
| 4,425,597 A * | 1/1984 | Schramm | G07C 9/00682 307/10.4 |
| 4,702,094 A * | 10/1987 | Peterson | E05B 47/0603 180/289 |
| 4,942,747 A * | 7/1990 | Pinnow | E05B 45/0605 70/263 |
| 4,991,884 A | 2/1991 | Cairns | |
| 5,000,493 A | 3/1991 | Bastien | |
| 5,853,060 A | 12/1998 | Chao et al. | |
| 6,109,670 A | 8/2000 | Tomaszewski et al. | |
| 6,149,210 A * | 11/2000 | Hunt | E05B 83/16 292/216 |
| 6,666,483 B2 | 12/2003 | Baniak et al. | |
| 7,204,526 B2 | 4/2007 | Seo | |
| 7,530,609 B2 | 5/2009 | Beauchamp et al. | |
| 8,419,114 B2 * | 4/2013 | Fannon | E05B 83/24 180/69.2 |
| 8,935,053 B2 * | 1/2015 | Wheeler | E05B 77/54 361/170 |
| 9,777,516 B2 * | 10/2017 | Farooq | E05B 47/0001 |
| 2013/0049403 A1 * | 2/2013 | Fannon | E05B 83/24 296/193.11 |
| 2013/0221685 A1 | 8/2013 | Polewarczyk et al. | |
| 2015/0115625 A1 * | 4/2015 | Park | E05B 83/24 292/194 |
| 2015/0191943 A1 * | 7/2015 | Tieman | E05B 81/00 292/195 |

FOREIGN PATENT DOCUMENTS

| | | | | |
|---|---|---|---|---|
| DE | 2757246 A1 | * | 6/1979 | ............ E05B 77/48 |
| DE | 19923703 | | 11/2000 | |
| DE | 10028697 | | 12/2001 | |
| EP | 0 604 055 A2 | | 6/1994 | |
| KR | 20040050981 A | * | 6/2004 | |
| KR | 482685 | | 4/2005 | |
| KR | 100575175 | | 5/2006 | |
| KR | 20100025114 A | * | 3/2010 | |
| WO | 2004 052674 | | 6/2004 | |
| WO | 2006 081367 | | 8/2006 | |
| WO | 2015 088461 | | 6/2015 | |
| WO | 2015088461 A1 | | 6/2015 | |

OTHER PUBLICATIONS

Machine Translation of DE 2757246 A1, 2020, pp. 1-13 (Year: 2020).*
Penn State College, "Secondary Hood Release Handle," www.if.psu.edu/Projects/?pid=297 (Spring 2011).

* cited by examiner

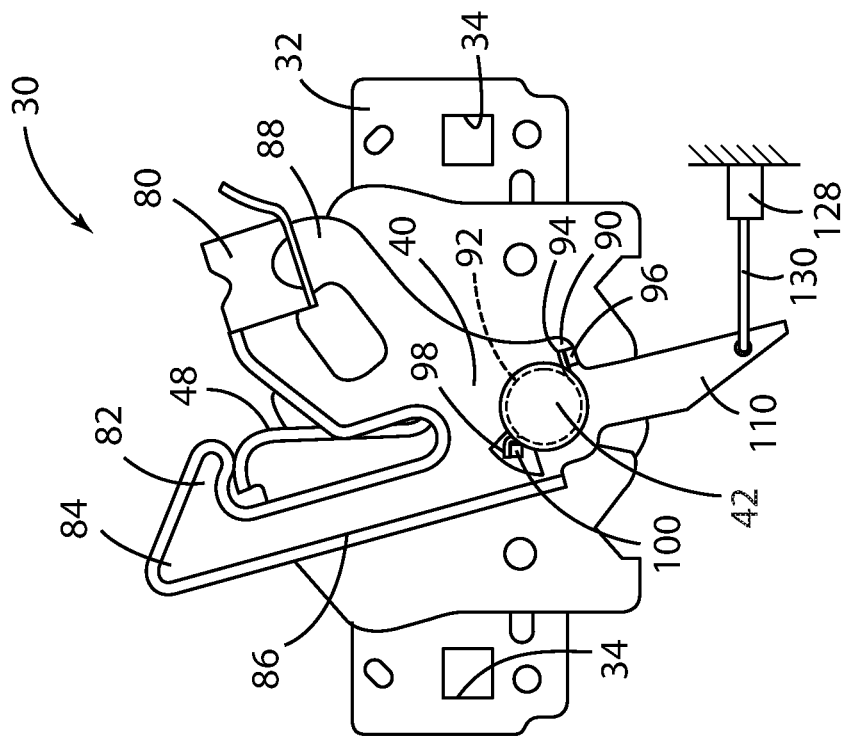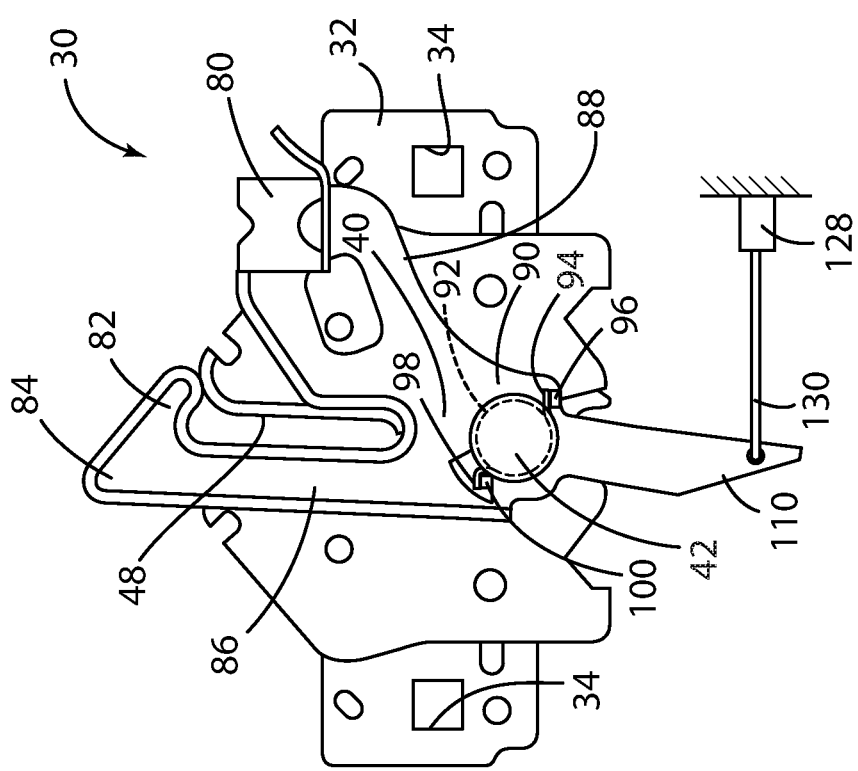

REMOTE SECONDARY HOOD LATCH RELEASE

FIELD OF THE INVENTION

The present disclosure generally relates to a mechanism by which to open the hood of a motor vehicle and, in particular, a remote secondary hood latch release by which to open the hood that employs an interior vehicle button, key fob, or smart phone operable only after a primary latch switch indicates an open position, a controller circuit that unlatches the secondary hood latch for a prescribed period of time and a hood proximity sensor operatively coupled with the hood that detects when the hood has been lifted to send a signal to the controller to deactivate the secondary hood latch release to enable the hood to be closed.

BACKGROUND OF THE INVENTION

Latch assemblies for motor vehicles are generally well-known in the art. In most motor vehicles, a hood is used to enclose the engine or luggage compartment of the motor vehicle. Such hoods are typically situated so as to be opened from the front of the vehicle and hinged along a rearward edge, such that the hood opens from the front of the vehicle. The hood is typically equipped with one or more strikers attached to the lower surface near the forward edge of the hood. The striker is situated to interact and to be restrained by the latch assembly attached to the motor vehicle chassis, likewise located proximate the forward edge of the hood. A latch release handle is often situated in the occupant compartment, typically near the driver's side kick panel or under the instrument panel. The handle may be connected via a Bowden cable to a latch release lever operatively connected to a primary hood latch of the latch assembly. Upon actuation of the hood release handle in the occupant compartment, the Bowden cable pulls on the latch release lever, thereby releasing the striker from the primary hood latch of the latch assembly. At this point, a spring assembly may be used to urge the hood upwardly to a partially open position at a pre-determined height, such as about 50-75 mm (or approximately 2-3 inches), and is held to this position by a secondary hood latch.

Such secondary hood latches are provided to mitigate inadvertent release of the primary hood latch handle or failure of the primary hood latch while the vehicle is in motion, which may cause the hood to abruptly rise due to wind pressure. Rather, the secondary hood latch requires an operator standing in front of the vehicle to manually operate the secondary hood latch to free the hood striker from the secondary hood latch of the latch assembly, thereby allowing the hood to be fully raised, providing access to the engine within the engine compartment and/or luggage within the luggage compartment.

Thus, in the context of latch assemblies having primary and secondary hood latches, after the operator pulls the primary hood latch release lever from inside the passenger compartment, the hood is released from engagement with the primary hood latch and moved to a secondary hood latch release position. The operator then must move to the front of the vehicle in close proximity to the hood, where the operator must then search for and locate a secondary hood latch release handle by inserting his or her fingers under the partially opened hood and then actuate the handle left or right (or up or down, depending the vehicle design) to release the secondary hood latch. The hood can then be fully opened, either manually or through some other assist mechanism, such as gas cylinders or torsion springs.

The location of the secondary hood latch release handle varies significantly from vehicle to vehicle. Particularly to an operator unfamiliar with the motor vehicle he or she may be operating, the secondary hood latch release handle can be frustratingly difficult to locate by touch alone. It is often difficult to see through the narrow, partial opening of the hood, particularly in poorly lit areas or at night. Hence, a hood latch assembly which overcomes these drawbacks would be advantageous.

The hood latch assembly disclosed herein particularly overcomes the foregoing drawbacks by the use of a remote secondary hood latch release that employs an interior vehicle button, key fob, or smart phone operable only after a primary latch switch indicates an open position, and a controller that unlatches the secondary hood latch for a prescribed period of time, thereby allowing the operator to fully raise the hood. A hood proximity sensor is operatively coupled with the hood that detects when the hood has been lifted to send a signal to the controller to deactivate the secondary hood latch release to enable the hood to be closed.

Thus, the solution presented by the present disclosure obviates the need for the operator to insert his or her fingers under the partially opened hood to actuate and release the secondary hood latch, and instead provides for convenient actuation of the secondary hood latch release handle from inside the vehicle or some other convenient location.

SUMMARY OF THE INVENTION

According to one aspect of the present disclosure, a motor vehicle secondary hood latch release mechanism for a hood having a closed condition and an open condition comprises a striker disposed on a forward lower surface of the hood, a primary hood latch having an engaged position in engagement with the striker when the hood is in the closed condition and a disengaged position disengaged from the striker when the hood is in the open condition, and a secondary hood latch having an engaged position in engagement with the striker and a disengaged position disengaged from the striker. A primary hood latch switch is operatively coupled with the primary hood latch that provides a signal to a controller indicating whether the primary hood latch is in the disengaged position. A remote secondary hood latch release device is operably coupled with the controller that actuates the secondary hood latch between the engaged position and the disengaged position. The remote secondary hood latch release device is operable only after the primary hood latch switch provides the signal to the controller indicating that the primary hood latch is in the disengaged position. A hood sensor is operatively coupled with the hood that provides a signal to the controller when the hood has been lifted to the open condition. The controller actuates the secondary hood latch to the disengaged position for a prescribed period of time upon actuation of a vehicle system input device, thereby allowing the hood to be raised to the open condition, and thereafter the controller actuates the secondary hood latch to the engaged position upon the earlier of expiration of the prescribed time or the hood sensor providing the signal to the controller that the hood has been lifted to the open condition.

According to a further aspect of the present disclosure, a hood latch release mechanism comprises a secondary hood latch, a remote secondary hood latch release device temporarily actuated only after a primary hood latch switch provides a signal to a controller indicating that a primary hood latch is disengaged, and a sensor providing a signal to the controller when the hood is lifted, after which the controller actuates the secondary hood latch to an engaged position.

According to another aspect of the present disclosure, a motor vehicle secondary hood latch release control system comprises a controller for a secondary hood latch control circuit and a primary hood latch switch operatively coupled with a primary hood latch having an engaged position in engagement with a hood striker when the hood is in a closed condition and having a disengaged position disengaged from the hood striker when the hood is in either a released condition or an open condition, wherein the primary hood latch switch provides a signal to the controller indicating that the primary hood latch is in either the engaged position or the disengaged position. A remote secondary hood latch release device actuates a secondary hood latch between an engaged position in engagement with the hood striker with the hood in the released condition and a disengaged position disengaged from the hood striker with the hood in the open condition. The remote secondary hood latch release device is operably coupled with the controller and is operable only after the primary hood latch switch provides the signal to the controller indicating that the primary hood latch is in the disengaged position and after receiving a system input signal from a vehicle system input device, while a sensor is operatively coupled with the hood that provides a signal to a controller when the hood has been lifted to the open condition. The controller actuates the secondary hood latch to the disengaged position for a prescribed period of time upon receiving the system input signal from the vehicle system input device, thereby allowing the hood to be raised to the open condition, after which the controller actuates the secondary hood latch to the engaged position after the earlier of the prescribed period of time or the sensor providing a signal to a controller that the hood has been lifted to the open condition.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 6 is a front plan view of the improved remote secondary hood latch release mechanism of the present disclosure with the secondary hood latch engaged;

FIG. 7 is a front plan view of the improved remote secondary hood latch release mechanism of the present disclosure with the secondary hood latch disengaged;

DETAILED DESCRIPTION OF THE EMBODIMENTS

Figure 1:
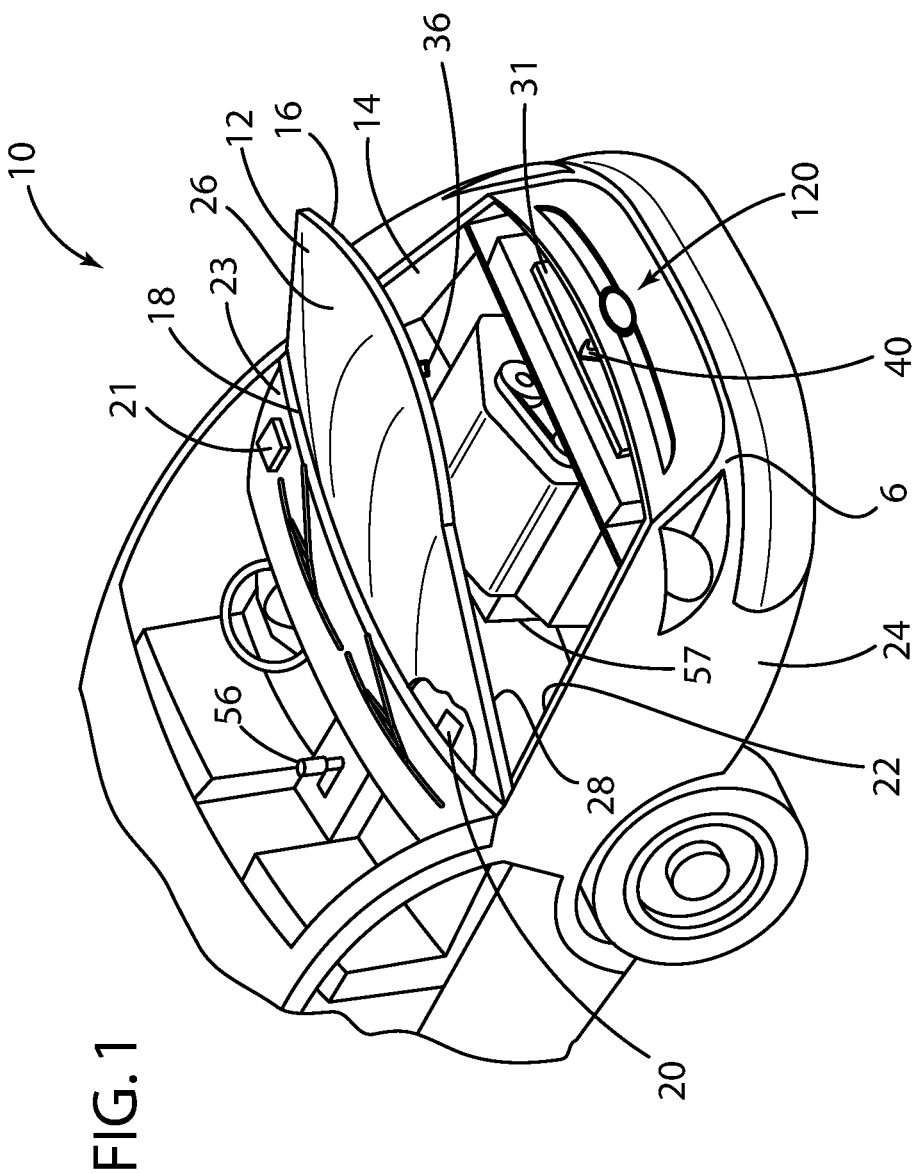
FIG. 1 is a front perspective view of a motor vehicle provided with the improved remote secondary hood latch release mechanism of the present disclosure.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Motor vehicle 10 includes a hood 12 covering an engine compartment 14. Hood 12 is generally formed as a panel having a forward edge 16 and a rearward edge 18. The rearward edge 18 of the hood 12 may be connected to the body of the motor vehicle 10 by hinges 20. In the closed position, hood 12 is disposed adjacent and extends across an opening 22 in the body 24 of motor vehicle 10 providing access to an engine compartment 14. Hood 12 has an upper surface 26 and a lower surface 28 and is releasably connected to the motor vehicle 10 by a hood latch assembly 30 and is pivotable relative to the motor vehicle 10 to move between an open position and a closed position. In the described embodiment, hood latch assembly 30 is located adjacent the forward edge 16 of the hood on a front chassis member 31 and the hinges 20 may be located at the rearward edge 18 of the hood 12.

Referring now to FIGS. 2-5, the hood latch assembly 30 is shown in detail. The hood latch assembly 30 includes a hood latch bracket 32 attached via mounting holes 34 to the front chassis member 31 via fasteners (not shown) extending transverse parallel to the lateral axis of the motor vehicle 10, as is well-known in the art. The hood latch assembly 30 interacts with a striker 36 disposed on the forward edge 16 of the hood 12 relative to the motor vehicle 10. The hood 12 has a closed locked position, a released position, and an open position. In the closed locked position, the hood 12 cannot be raised and is restrained in place by a primary hood latch 38 capturing and restraining the striker 36. A secondary hood latch 40 is also provided and is pivotally attached via a pivot mount 42 to the hood latch bracket 32 so as to also capture and restrain the striker 36 in the event that the primary hood latch 38 is released.

As shown in the FIGS. 3-6, the primary hood latch 38 rotates around a latch pivot bolt 70 between an engaged position and a disengaged position. In the embodiment shown, the primary hood latch 38 is provided with an upper latch leg 44 that includes a transverse portion 46 that extends upwardly and away from a channel 48 provided in the hood latch bracket 32 for engaging and capturing the striker 36 of the hood 12.

Figure 2:
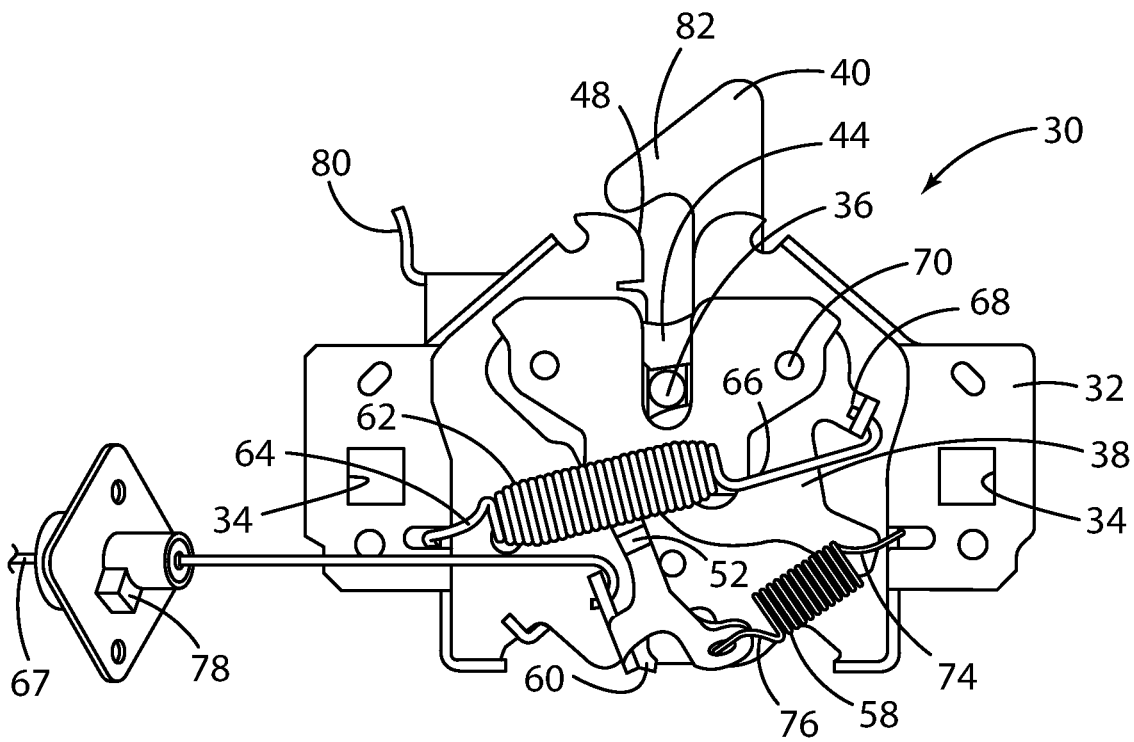
FIG. 2 is a rear plan view of a hood latch release mechanism of the prior art.
Figure 3:
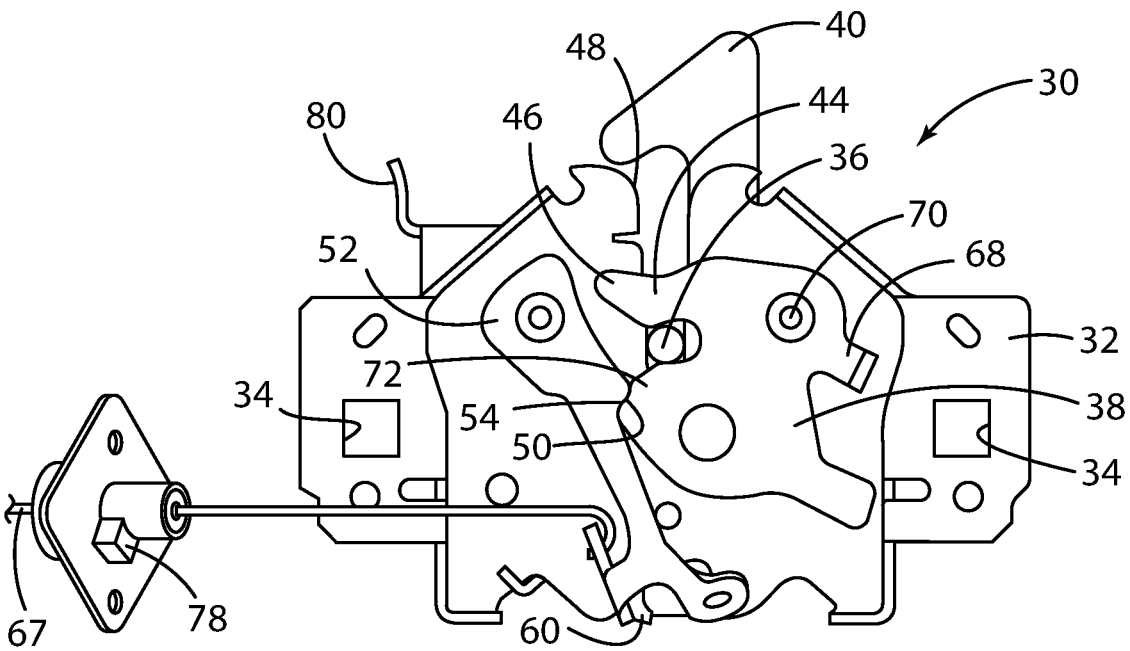
FIG. 3 is a another rear plan view of a hood latch release mechanism of the prior art.
Figure 4:
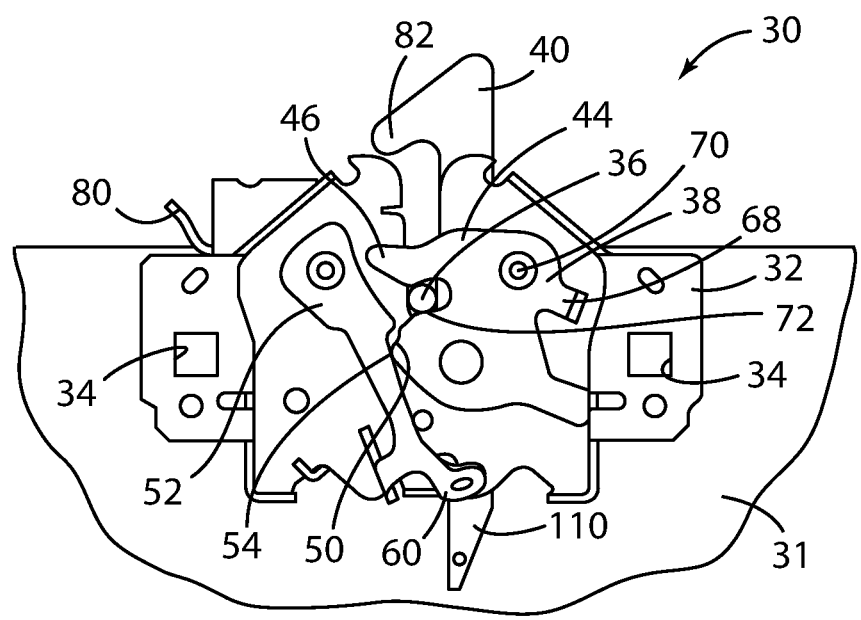
FIG. 4 is a rear plan view of the improved remote secondary hood latch release mechanism of the present disclosure with the primary hood latch engaged.

As best shown in FIGS. 2 and 3, the primary hood latch 38 is provided with a single pawl engaging tab 50 for engaging a latch cam engaging surface 54 of a pawl 52 of the hood latch assembly 30. The distal end 60 of pawl 52 is connected to a Bowden cable 67, and the latch cam engaging surface 54 of the pawl 52 is urged into contact with the pawl engaging tab 50 by a pawl spring 58 acting on pawl 52 to rotate the pawl 52 counterclockwise and by primary hood latch spring 62 acting on primary hood latch 38 to rotate the primary hood latch 38 clockwise, as best seen in FIG. 2. As shown, pawl spring 58 has a first end 74 attached to the bracket 32 and an opposite second end 76 attached to the distal end 160 of the pawl 52. Primary hood latch spring 62 likewise has a first end 64 attached to the hood latch bracket 32 and an opposite second end 66 attached to a latch spring mounting ear 68 provided on the primary hood latch 38.

Figure 5:
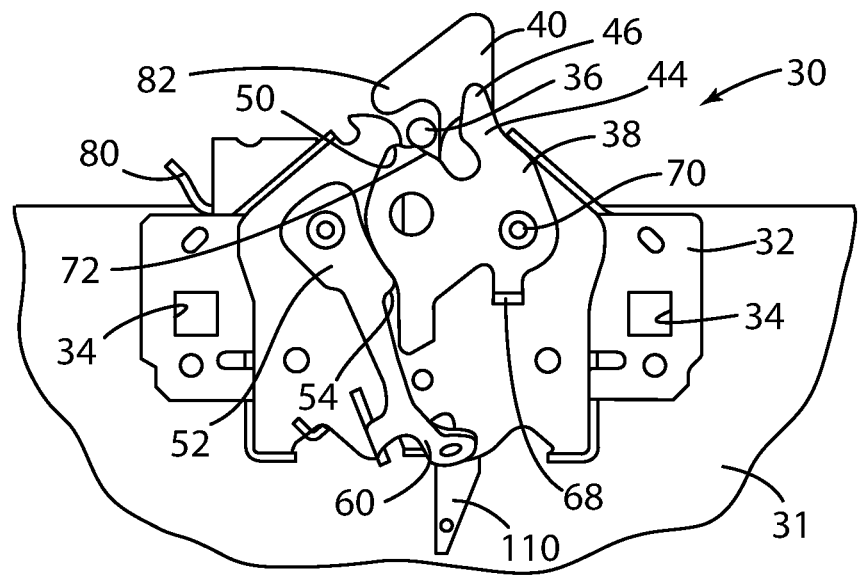
FIG. 5 is a rear plan view of the improved remote secondary hood latch release mechanism of the present disclosure with the primary hood latch disengaged.

In operation, the motor vehicle operator releases a primary hood latch release lever from inside of passenger compartment of the motor vehicle (not shown), which pulls on the Bowden cable 67. Actuation of the Bowden cable 67 pulls on the distal end 60 of the pawl 52 and thereby causes the pawl 52 to rotate against the force of pawl spring 58, in a clockwise direction, to release the pawl engaging tab 50 of the primary hood latch 38 from the latch cam engaging surface 54 of the pawl 52, as shown in FIG. 5. With the primary hood latch 38 now free to rotate under the urging of the primary hood latch spring 62, an arcuate bottom surface 72 of the primary hood latch 38 urges the striker 36 upwardly within the channel 48. Optionally, a vertically oriented spring assembly (not shown) may be disposed beneath a forward portion of the lower surface 28 of the hood 12, or torsion springs (not shown) coupled with the hinges 20, or gas pistons (not shown) may be used to further urge the hood 12 to a slightly open position. A primary hood latch switch 78 provides a change of state signal to the motor vehicle 10 when the primary hood latch 38 is activated.

As the striker 36 reaches the upper portion of the channel 44 and is essentially free of the primary hood latch 38, the striker 36 engages the secondary hood latch 40, which is normally held in the latched position, thereby allowing the hood 12 to be partially raised, typically about 50-75 mm (or about 2-3 inches). The vehicle operator must then go to the front of the motor vehicle 10 and, in accordance with the prior art, manually operate a secondary hood latch handle 80 to rotate the secondary hood latch 40 and thereby free the striker 36 from the secondary hood latch 40 to allow the hood 12 to be raised.

The secondary hood latch 40 may be configured with a locking hook 82 at a first distal end 84 of an upwardly extending arm 86 disposed to engage the striker 36 and the secondary hood latch handle 80 integrated into an integrated metal member 88, preferably fabricated from stamped steel.

Thus, the upwardly extending arm 86 of the secondary hood latch 40 and the secondary hood latch handle 80 form a generally U-shaped configuration with the pivot mount 42 disposed mounted at a bottom portion 90 thereof. The pivot mount 42 is used to pivotally attach the bottom portion 90 of the integrated metal member 88 to the latch bracket 32. The secondary hood latch 40 is urged to a first position in engagement with the striker 36 by a torsion spring 92 disposed about the pivot mounted 42. Preferably, the torsion spring 92 has a first leg 94 acting against a spring tab 96 mounted on the integrated metal member 88 of the secondary hood latch 40 and a second leg 98 acting against a spring tab 100 mounted on the latch bracket 32. The secondary hood latch 40 must be manually actuated by the vehicle operator against the force of the torsion spring 92 to a second position that is disengaged from the striker 36 in order to release the hood 12.

The prior art configurations of the secondary hood latch handle 80 shown in FIGS. 2 and 3 may also be encased in a plastic material, by which the motor vehicle operator may rotate the secondary hood latch 40 out of engagement with the striker 36. That is, with the hood 12 in the slightly open position, there thus exists enough room for the motor vehicle operator to insert a hand under the hood 12, after the primary hood latch 38 is released, in order to release the secondary hood latch 40 by manipulating the secondary hood latch handle 80 to the left (in the embodiment shown in FIGS. 2 and 3, which may vary with vehicle design) to manually rotate the secondary hood latch 40 from an engaged position with the striker 36 to a disengaged position relative the striker 36. Upon doing so, the striker 36 is free to rise upwardly within the channel 44 and the hood latch assembly 30 to thereby allow the hood 12 to be fully opened, whereupon the motor vehicle operator can have full access to the engine compartment 14 situated beneath the hood 12.

However, as noted above, the foregoing description requires the motor vehicle operator to insert a hand under the hood 12 to release the striker 36. Particularly in low light circumstances, this may be difficult and may result in injury to the motor vehicle operator's hand if not done correctly. Further, in the event that the motor vehicle operator is unfamiliar with the motor vehicle 10, for example, as in a rental car, the operator of the motor vehicle 10 may have to fumble about in order to properly manipulate the secondary hood latch handle 80 to disengage a secondary hood latch 40.

The improvement of the present disclosure relates to the use of an innovative secondary hood latch release mechanism. As noted above, the secondary hood latch 40 has a locking hook 82 at a first distal end 84 disposed of the vertically extending arm 86 to engage the striker 36 when in the first position and a pivot mount 42 by which secondary hood latch 40 is pivotally attached to the front chassis member 31 of the motor vehicle 10 and about which the secondary hood latch 40 pivots. Preferably, a solenoid 128 is mounted to the latch bracket 32 or some other conventional location on the motor vehicle chassis and is operatively coupled with the secondary hood latch handle 80, as further discussed herein below. The secondary hood latch 40 may thus retain the conventional secondary hood latch handle 80 to thereby raise the hood as a failsafe alternative. Alternatively, the secondary hood latch handle 80 can be omitted.

The motor vehicle secondary hood latch release control system includes a vehicle system input module 102, controller 104 for a secondary hood latch control circuit 105, the primary hood latch switch 78 operatively coupled with the primary hood latch 38 that provides a signal to the controller 104 indicating that the primary hood latch 38 is in either the engaged position or the disengaged position, a remote secondary hood latch release device 106 that actuates the secondary hood latch 40 between the engaged position and the disengaged position, and a sensor 108 operatively coupled with the hood 12 that provides a signal to a controller 104 when the hood 12 has been lifted to the open condition. In operation, the controller 104 actuates the secondary hood latch 40 to the disengaged position for a prescribed period of time upon actuation of the remote secondary hood latch release device 106, thereby allowing the hood 12 to be raised to the open condition. After the prescribed period of time, the controller 104 actuates the secondary hood latch 40 to the engaged position to enable the hood 12 to be returned to the released or closed condition.

Figure 8A:
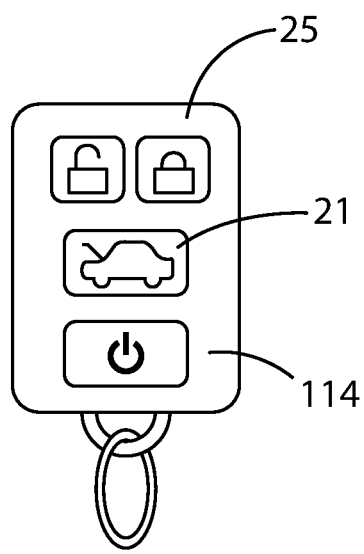
FIG. 8A is a front view of an embodiment of a key fob as the vehicle system input device of the improved remote secondary hood latch release mechanism of the present disclosure.
Figure 8B:
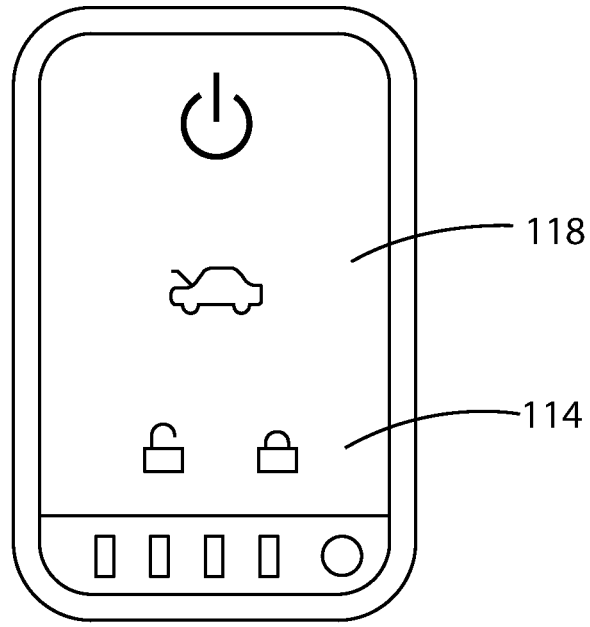
FIG. 8B is a front view of an embodiment of a personal computing device as the vehicle system input device of the improved remote secondary hood latch release mechanism of the present disclosure.

The vehicle system input module 102 is preferably operably coupled with a vehicle system input device 114 and provides a system input signal to the controller 104. As shown in FIG. 1, the vehicle system input device 114 may include a push button or switch 21 mounted within the passenger compartment of the motor vehicle, such as on the instrument panel 23 or on a kick panel proximate the primary hood latch lever. Alternatively, the vehicle system input device 114 may be provided by a wireless source, such as a key fob 25, as shown in FIG. 8A. If the key fob 25 is used, it may utilize the existing radio frequency wireless communication already present in the motor vehicle 10. Alternatively, a personal computing device 118, such as an iPhone or iPad, as shown in FIG. 8B, may be provided with wireless communication (Wifi, Bluetooth or other wireless medium, such as a cellular phone network), as well as an appropriate application to provide the switching functionality.

Most preferably, the vehicle system input module 102 comprises a Bluetooth OBDII signal receiving module 116 operably coupled with the controller 104, wherein the operator-actuated vehicle system input device 114 provides a Bluetooth signal from the personal computing device 118 to the Bluetooth OBDII signal receiving module 116, typically in the module which operates the center stack driver controls. The Bluetooth OBDII signal receiving module 116, which is preferably powered by the motor vehicle battery at a nominal 12-14 V, in turn provides the system input signal to the controller 104 by dropping the system input signal originating from the Bluetooth OBDII signal receiving module 116 to 0 V from about an original 5 V after receiving an operator-actuated input signal from the personal computing device 118 operated by the motor vehicle operator. Alternatively, if a Wifi signal is used, it may be received by a wireless router (not shown) in the instrument panel 23, as is known. Similarly, a cellular signal may be received by a phone (not shown) embedded in the motor vehicle 10 through an external antenna (not shown), again as is known. Regardless of the source, the wireless signal is decoded in the receiving module 116, which operates one or more of its serial output ports to create and deliver the system input signal to controller 104, as discussed below.

The controller 104 is operable in response to the system input signal, but only under certain conditions. According to the present disclosure, the controller 104 preferably may only actuate the secondary hood latch 40 after the motor vehicle transmission 57 of the motor vehicle 10 is placed in "PARK" and the primary hood latch 38 has been actuated from the engaged position to the disengaged position and the primary hood latch switch 78 changes state when the primary hood latch 38 is so actuated. This can be accomplished by providing the output of the existing transmission gear selector 56 and primary hood latch switch 78 to the controller 104. The primary hood latch 78 changes state when the primary hood latch 38 is activated, and that output is used to activate the controller 104. The initial system input signal, sent from any of the aforementioned vehicle system input devices 114, provides the vehicle system input from the motor vehicle operator that opening the secondary hood latch 40 is desired.

Figure 9:
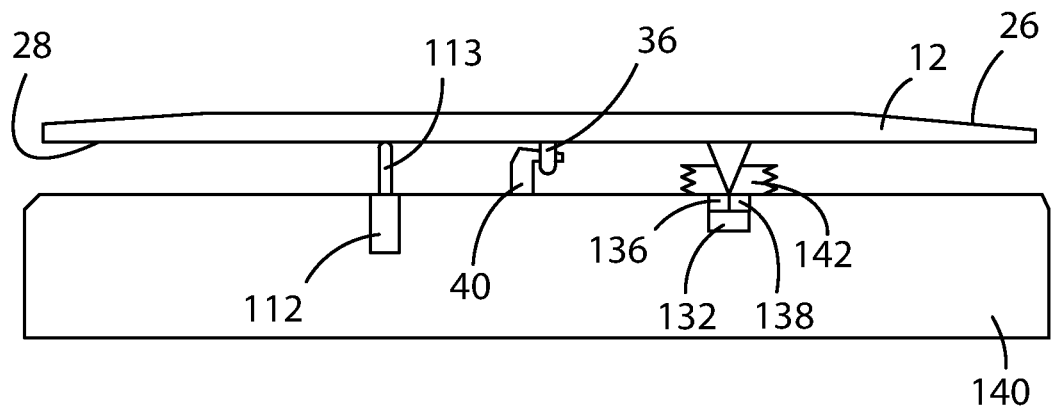
FIG. 9 is a front view of the hood proximity sensor of the improved remote secondary hood latch release mechanism of the present disclosure.

Alternatively, as shown in FIG. 9, the primary hood latch switch 78 may be replaced with a spring-loaded plunger switch 112 disposed beneath the lower surface 28 of the hood 12 and in a normally open state with the hood 12 in the closed condition, thereby interrupting electrical continuity between the controller 104 and/or the remote secondary hood latch release device 106 and the chassis ground of the motor vehicle 10 when the hood 12 is in the closed position. Thus, electrical power is not delivered to the controller 104 for the secondary hood latch control circuit 105 and/or the remote secondary hood latch release device 106.

However, when the primary hood latch 38 is actuated from its engaged position to its disengaged position, the hood rises 50-75 mm (or approximately 2-3 inches) to a released condition, where the striker 36 encounters the secondary hood latch 40, which prevents further upward motion of the hood 12. This displacement allows the plunger 113 of the spring-loaded plunger switch 112 to extend, thereby establishing continuity between the controller 104 and/or the remote secondary hood latch release device 106 and allowing actuation of the remote secondary hood latch release device 106.

Figure 11:
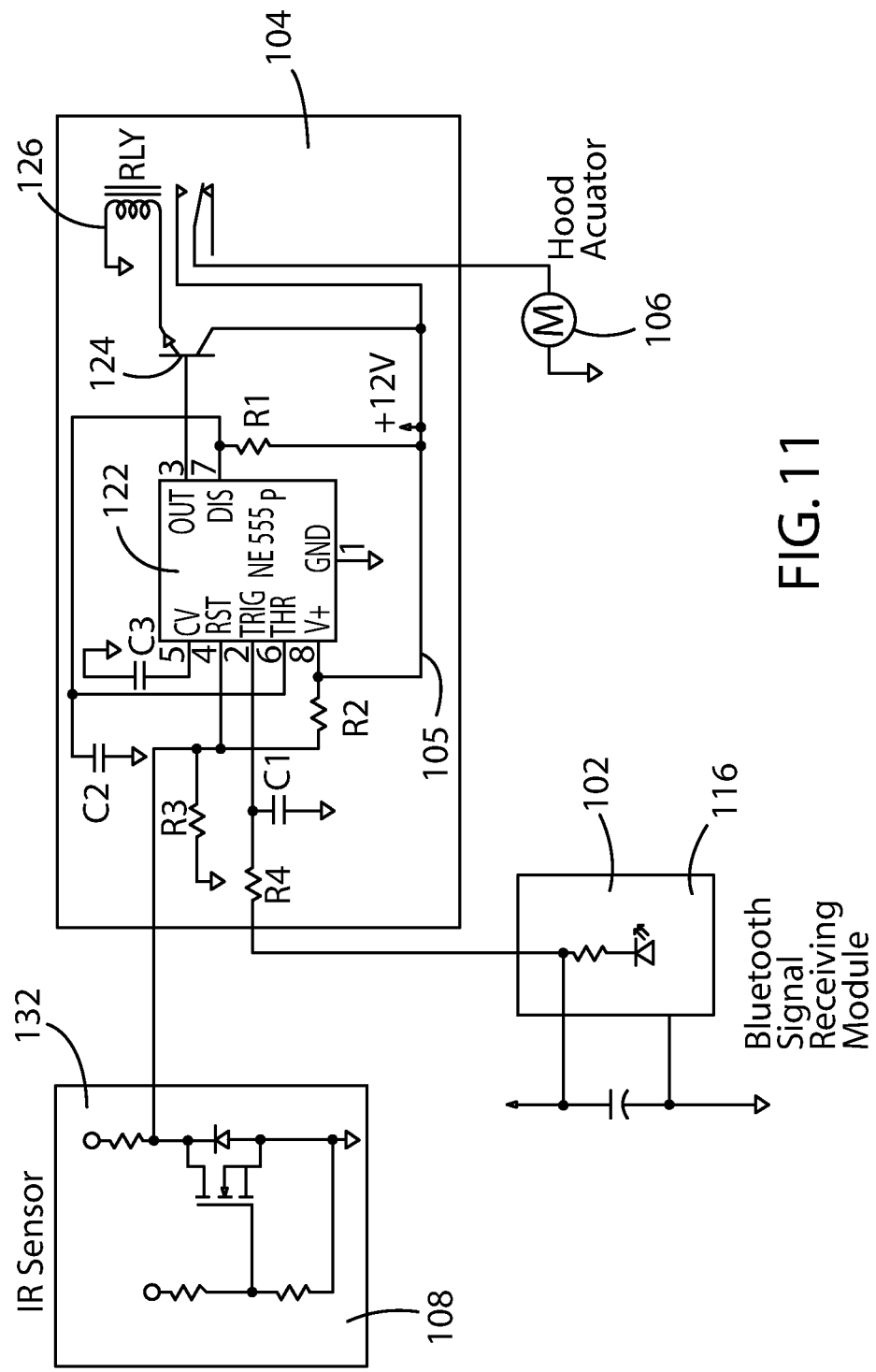
FIG. 11 is a view of the circuit diagram for the controller for the remote secondary hood latch release control circuit of the improved hood latch release mechanism of the present disclosure.

As shown in FIG. 11, the controller 104 for the secondary hood latch control circuit 105 preferably utilizes a standard 555 timer integrated circuit 122 configured in monostable mode. The No. 1 GND pin is in electrical continuity with the chassis ground of the motor vehicle 10, as is conventional, while the positive supply voltage is provided to the controller 104 for the secondary hood latch control circuit 105 via No. 8 $V_+$ pin, which is electrically connected with the motor vehicle battery at a nominal 12-14 V.

The No. 2 TRIG pin is connected to the vehicle system input module 102 that delivers the system input signal to the controller 104 for the secondary hood latch control circuit 105 after receiving an operator-actuated input signal from the vehicle system input device 114, signaling the controller 104 to actuate the secondary hood latch 40. The controller 104 for the secondary hood latch control circuit 105 then generates an output pulse via the No. 3 OUT pin to drive a switching transistor 124 (preferably a 2N550 transistor), which in turn activates a relay 126, which is designed to provide the higher current required by the remote secondary hood latch release device 106, described further below. As noted above, however, the controller 104 may only activate the secondary hood latch 40 after the primary hood latch 38 has been activated. Thus, if the state of the primary hood latch switch 78 has not changed, indicating that the primary hood latch 38 is still in the engaged position, the controller 104 for the secondary hood latch control circuit 105 will not generate an output pulse.

The controller 104 for the secondary hood latch control circuit 105 is configured to generate an output pulse having a preset timing interval or output pulse width to hold the secondary hood latch 40 open for a prescribed period of time, as determined by the values of the resistors and capacitors connected to the No. 7 DIS pin on the 555 timer integrated circuit 122. This is intended to provide the motor vehicle operator sufficient time to approach the hood 12 and lift it open. The prescribed period of time for the output pulse width is preferably set from between 30 seconds to 120 seconds, as design considerations may dictate.

Preferably, the values of the resistors and capacitors connected to the No. 7 DIS pin on the 555 timer integrated circuit 122 include 30 kΩ resistor R1, 9.5 Ω resistor R2, 6.49 Ω resistor R3, 20 Ω resistor R4, 470 pF capacitor C1, and 100 μF capacitor C2. The No. 6 THR pin ends the timing interval (controlling the No. 3 OUT pin) when the voltage accumulating in C2 from the No. 7 DIS pin exceeds the No. 6 THR pin internal threshold (preferably 2/3 the No. 8 V+ pin, if the No. 5 CV (CTRL VOLT) pin is open). The No. 5 CV (CTRL VOLT) pin is electrically connected with the motor vehicle ground via a 0.01 μF capacitor C3 in order to reduce extraneous noise in the circuit.

As can be seen in FIGS. 4-7, in accordance with the present disclosure, the remote secondary hood latch release device 106 preferably comprises the solenoid 128 and the secondary hood latch 40 includes a vertically depending secondary hood latch release pawl 110. The solenoid 128 is situated to rotate the secondary hood latch 40 counterclockwise from the first position engaged with the striker 36 to the second position disengaged from the striker 36. Thus, as the relay 126 and solenoid 128 are actuated, the solenoid 128 actuates the secondary hood latch 40. The solenoid 128 preferably comprises an actuator 130 operatively coupled with the secondary hood latch release pawl 110 to displace the secondary hood latch 40 from the engaged position to the disengaged position. The remote secondary hood latch release device 106 is thus operably coupled with the controller 104 and is operable only after the primary hood latch switch 78 provides the signal to the controller 104 for the secondary hood latch control circuit 105 indicating that the primary hood latch 38 is in the disengaged position.

The motor vehicle secondary hood latch 40 also preferably utilizes a resilient member urging the solenoid 128 to return to the engaged position after the hood 12 is raised. As noted above, the secondary hood latch 40 is preferably urged to the first position in engagement with the striker 36 by the torsion spring 92, and must be manually actuated against the force of the torsion spring 92 to the second position that is disengaged from the striker 36. Preferably, the torsion spring 92 mounted about the pivot mount 42 rotatably coupling the secondary hood latch 40 to the latch bracket 32 so as to urge the secondary hood latch 40 to the first position serves as the resilient member.

While it is necessary that the secondary hood latch 40 be held open while lifting the hood 12 in order for the hood latch assembly 30 to release the hood 12 properly, it is also important that the secondary hood latch 40 be deactivated before the hood 12 is sought to be closed. Since the secondary hood latch 40 is in the disengaged position while being held open by the remote secondary hood latch release device 106 for the prescribed period of time established by the output pulse width, the secondary hood latch 40 will not engage the hood 12 if there is any attempt to close the hood 12 within that period of time, perhaps resulting in damage to the hood latch assembly 30 and/or the hood 12. Thus, a simple timer is not adequate to control the secondary hood latch function, but rather additional safeguards must be employed.

Accordingly, the sensor 108 is provided, which can be an ultrasonic sensor or hall-effect switch, but may also be an infrared proximity sensor 132 mounted proximate the forward edge 16 of the hood 12 and generally proximate the hood latch assembly 30. The infrared proximity sensor 132 employs a light sensor 136 capable of detecting light wavelength in the infrared spectrum. When used in combination with an LED 138, which produces light at the same wavelength and reflects it off an object to be measured, such as the hood 12, the light sensor 136 measures the intensity of the reflected and received light. When the hood 12 is in the closed condition and thereby brought into proximity with the sensor 136, preferably mounted on an upper portion of the grill 140, the light from the LED 138 bounces off the hood 12 and into the light sensor 136. This results in the sensor 136 detecting a threshold value corresponding to the hood 12 being in proximity with the infrared proximity sensor 132 and in the closed condition.

Thus, to return the secondary hood latch 40 to its engaged position, a signal is provided by the infrared proximity sensor 132 that is designed to detect the absence of the hood 12 proximate the infrared proximity sensor 132. The infrared proximity sensor 132 therefore senses when the hood 12 has been lifted from the closed position, beyond the released position which is still engaged by the secondary hood latch 40, and to the open position, which is free of the secondary hood latch 40, by the intensity of the reflected light. The disclosed infrared proximity sensor 132 is preferably mounted on the top of the grille 140 to detect the opening of the hood 12 and provides a signal to the controller 104, as described below.

The infrared proximity sensor 132 is preferably used to detect the absence of a proximate object, as opposed to the alternative methods of detecting the presence of an object. While it is contemplated that a spring-loaded plunger switch similar to spring-loaded plunger switch 112 could be used, a large amount of travel of the hood 12 between the closed position in the open position is problematic. That is, release of the primary hood latch 38 allows the forward edge 16 of the hood 12 to rise approximately 50-75 mm (approximately 2-3 inches) before the secondary hood latch 40 is engaged. This distance would require a plunger switch 112 with a considerable stroke, which would protrude from the top of the grille 140 and be subject to damage.

In the preferred embodiment, as the hood 12 is opened, the infrared proximity sensor 132 will no longer detect the presence of the hood 12, and the infrared proximity sensor 132 will then send a signal to the controller 104 via the No. 4 RESET pin, which resets the controller 104 for the secondary hood latch control circuit 105. This in turn causes the controller 104 to terminate the output pulse from the NO. 3 OUT pin. This causes the switching transistor 124 to deactivate the relay 126, returning the solenoid 128 to a de-energized condition and, upon the urging of spring 92, returning the secondary hood latch 40 to its engaged position to enable the hood 12 to be closed. Preferably, the infrared proximity sensor 132 is surrounded by a rubber boot 142, to seal the LED 138 from dirt and debris. Alternately, for the same reason, the infrared proximity sensor 132 can be mounted on the hood 12 itself, pointing downwards into the plastic that the covers a component proximate the front chassis member 31, such as a radiator frame or other structure.

Figure 10:
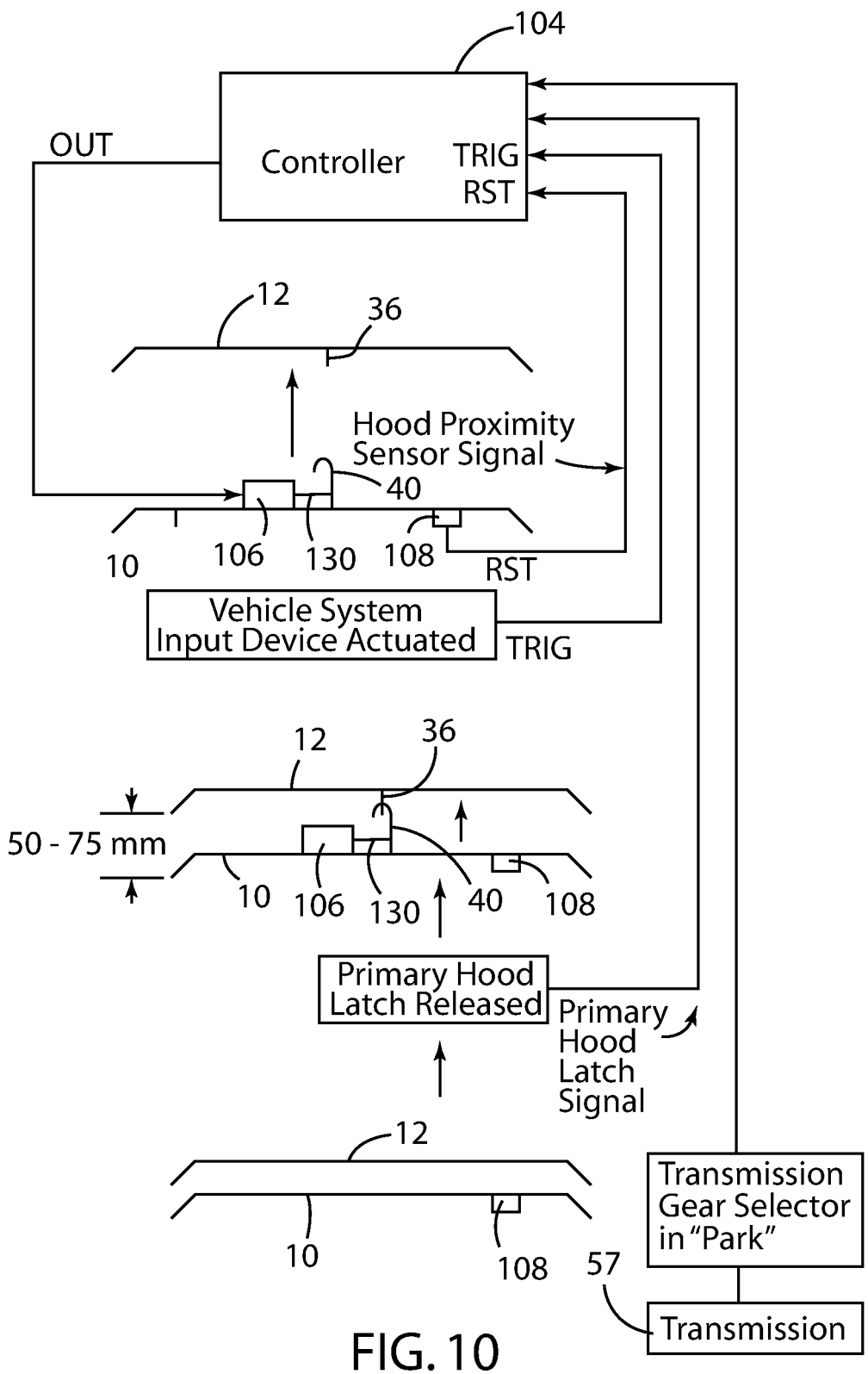
FIG. 10 is a schematic view of the operation of the controller for the remote secondary hood latch release control circuit of the improved hood latch release mechanism of the present disclosure.

To operate the motor vehicle latch assembly 30 in accordance with the present disclosure, as depicted in FIG. 10, the motor vehicle operator releases the primary hood latch release lever from inside of passenger compartment of the motor vehicle 10 to release the primary hood latch 38 from the striker 36 attached to the lower surface 28 of the hood 12. The primary hood latch switch 78 then provides a signal to the controller 104 indicating that the primary hood latch 38 is in the disengaged position. The primary hood latch 38 then rotates under the urging of the primary hood latch spring 62 and the arcuate bottom surface 72 of the primary hood latch 38 urges the striker 36 upwardly within the channel 48 until the striker 36 encounters the secondary hood latch 40.

The motor vehicle operator must then actuate the secondary hood latch 40 in order to raise the hood 12. However, in this instance, there is no requirement that the motor vehicle operator leave the motor vehicle 10 to do so or insert a hand under forward edge 16 of the hood 12 after the primary hood latch 38 is released in order to release the secondary hood latch 40. Rather, it is only necessary that the motor vehicle operator provide the system input signal from the vehicle system input device 114, such as the push button or switch 21 located within the passenger compartment, the key fob 25, or the personal computing device 118. Providing the system input signal will, in turn, actuate the controller 104 for the secondary hood latch control circuit 105 to actuate the remote secondary hood latch release device 106 (or solenoid 128), which then rotates the secondary hood latch 40 from an engaged position with the striker 36 to a disengaged position relative the striker 36. Upon doing so, the striker 36 is free to rise upwardly from the hood latch assembly 30 and thereby allow the hood 12 to be fully opened. After a prescribed period of time, the controller 104 for the secondary hood latch control circuit 105 de-energizes the solenoid 128. Further, if the infrared proximity sensor 132 determines that the hood 12 has been raised to its open condition prior to expiration of the prescribed period of time, the controller 104 for the secondary hood latch control circuit 105 de-energizes the solenoid 128, returning the secondary hood latch 40 to its engaged position and allowing the hood 12 to be closed without interference or damage.

The combination of the controller 104, the vehicle system input device 114, and the infrared proximity sensor 132, along with an electrically actuated mechanical actuator, such as solenoid 128, uniquely provide a system for remotely releasing the secondary hood latch 40 in proper sequence to activate the secondary hood latch 40 in a manner that is transparent to the motor vehicle operator and avoid damage to the components of the motor vehicle 10.

A further advantageous feature of the present disclosure is that it is not necessarily a replacement for current hood latch release mechanisms. Rather, it can be incorporated into existing hood latch assemblies 30 as an additional feature. The present disclosure merely provides a more convenient actuator scheme that may be added to existing hood latch release mechanisms in order to remotely actuate the secondary hood latch 40 to a disengaged position relative the striker 36, allowing the motor vehicle operator to raise the hood 12 without the motor vehicle operator having to insert a hand under the hood 12. Rather, the hood 12 may be raised by simply actuating a vehicle system input device 114, such as a push button or switch 21 disposed in the passenger compartment of the motor vehicle 10, a key fob 25, or a personal computing device 118, such as a cellular phone.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "operably coupled" and "operably connected" generally mean that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A motor vehicle secondary hood latch release mechanism for a hood having a closed condition and an open condition comprising:
   a striker disposed on a forward lower surface of the hood;
   a primary hood latch having an engaged position in engagement with the striker when the hood is in the closed condition and a disengaged position disengaged from the striker when the hood is in the open condition;
   a secondary hood latch having an engaged position in engagement with the striker and a disengaged position disengaged from the striker, the secondary hood latch comprising an integrated member comprising a first distal end having a locking hook disposed on a vertically extending arm to engage the striker when in the engaged position and a secondary hood latch handle, a pivot mount by which secondary hood latch is pivotally attached to a front chassis member of the motor vehicle and about which the secondary hood latch pivots, and a second distal end upon which is disposed a vertically depending secondary hood latch release pawl;

a primary hood latch switch operatively coupled with the primary hood latch that provides a signal to a controller indicating whether the primary hood latch is in the disengaged position;

a remote secondary hood latch release device operably coupled with the vertically depending secondary hood latch release pawl and the controller that actuates the secondary hood latch between the engaged position and the disengaged position, wherein the remote secondary hood latch release device is operable only after a motor vehicle transmission is placed in "Park" and the primary hood latch switch provides the signal to the controller indicating that the primary hood latch is in the disengaged position; and a hood sensor operatively coupled with the hood that provides a signal to the controller when the hood has been lifted to the open condition;

wherein the controller actuates the secondary hood latch to the disengaged position by displacement of the vertically depending secondary hood latch release pawl for a prescribed period of time upon actuation of a vehicle system input device, thereby allowing the hood to be raised to the open condition, and thereafter the controller actuates the secondary hood latch to the engaged position by displacement of the vertically depending secondary hood latch release pawl upon the earlier of expiration of the prescribed period of time or the hood sensor providing the signal to the controller that the hood has been lifted to the open condition; and wherein the secondary hood latch handle is adapted the actuate the secondary good latch to the disengaged position by displacement of the secondary hood latch handle as a failsafe alternative to actuation by the controller.

2. The motor vehicle of secondary hood latch release mechanism of claim 1, wherein the remote secondary hood latch release device is a solenoid mounted to a motor vehicle chassis, the solenoid comprising an actuator operatively coupled with the secondary hood latch to displace the secondary hood latch from the engaged position to the disengaged position.

3. The motor vehicle secondary hood latch release mechanism of claim 1, wherein the hood sensor is an infrared proximity sensor.

4. The motor vehicle secondary hood latch release mechanism of claim 1, wherein the controller comprises a secondary hood latch control circuit that generates an output pulse only after the motor vehicle transmission is placed in "Park" and the primary hood latch switch provides the signal to the secondary hood latch control circuit indicating that the primary hood latch has been moved to the disengaged position.

5. The motor vehicle secondary hood latch release mechanism of claim 4, wherein the vehicle system input device is a button or switch within a passenger compartment of the motor vehicle, a motor vehicle key fob, or a personal computing device.

6. The motor vehicle secondary hood latch release mechanism of claim 5, further comprising a Wifi, Bluetooth, or other wireless medium signal receiving module operably coupled with the secondary hood latch control circuit, and wherein the vehicle system input device generates the wireless medium signal from a personal computing device.

7. The motor vehicle secondary hood latch release mechanism of claim 4, further comprising a solenoid operably coupled with the secondary hood latch and wherein the secondary hood latch control circuit activates the solenoid to actuate the secondary hood latch to the disengaged position in response to actuation of the vehicle system input device.

8. The motor vehicle secondary hood latch release mechanism of claim 4, wherein the secondary hood latch control circuit utilizes a 555 timer integrated circuit configured for monostable mode operation.

9. The motor vehicle secondary hood latch release mechanism of claim 8, wherein the secondary hood latch control circuit comprises a trigger input to receive a system input signal from the vehicle system input device and to generate the output pulse having an output pulse width corresponding to the prescribed period of time.

10. The motor vehicle secondary hood latch release mechanism of claim 9, wherein the output pulse generated by the secondary hood latch control circuit actuates a switching transistor, which in turn activates a relay to actuate the remote secondary hood latch release device.

11. The motor vehicle secondary hood latch release mechanism of claim 10, wherein the remote secondary hood latch release device is a solenoid mounted to a motor vehicle chassis, the solenoid comprising an actuator operatively coupled with the secondary hood latch to displace the secondary hood latch from the engaged position to the disengaged position.

12. The motor vehicle secondary hood latch release mechanism of claim 1, wherein the hood sensor provides the signal to the controller only when the hood has been lifted from the closed position, beyond a released position engaged by the secondary hood latch, and to the open position which is free of the secondary hood latch.

13. The motor vehicle secondary hood latch release mechanism of claim 12, wherein the signal provided by the hood sensor to the controller when the hood has been lifted to the open condition resets the secondary hood latch control circuit and deactivates the remote secondary hood latch release device to return the secondary hood latch to the engaged position.

14. The hood latch assembly of claim 1, wherein the controller actuates the secondary hood latch from the engaged position to a disengaged position in response to a system input signal generated by a vehicle system input device.

15. The hood latch assembly of claim 14, wherein the controller generates an output pulse having an output pulse width that maintains the secondary hood latch in the disengaged position for a prescribed period of time.

16. The hood latch assembly of claim 1, wherein the remote secondary hood latch release device is a solenoid and the signal provided to the controller from the sensor when the hood has been lifted resets the controller and deactivates the solenoid to actuate the secondary hood latch to the engaged position.

17. A motor vehicle secondary hood latch release control system comprising:

a controller for a secondary hood latch control circuit;

a primary hood latch switch operatively coupled with a primary hood latch having an engaged position in engagement with a hood striker when a hood is in a closed condition and having a disengaged position disengaged from the hood striker when the hood is in either a released condition or an open condition, wherein the primary hood latch switch provides a signal to the controller indicating that the primary hood latch is in either the engaged position or the disengaged position;

a remote secondary hood latch release device that actuates a secondary hood latch between an engaged position in engagement with the hood striker with the hood in the released condition and a disengaged position disengaged from the hood striker with the hood in the open condition, wherein the remote secondary hood latch release device is operably coupled with the controller and is operable only after a motor vehicle transmission is placed in "Park" and the primary hood latch switch provides the signal to the controller indicating that the primary hood latch is in the disengaged position and after receiving a system input signal from a vehicle system input device, the secondary hood latch comprising an integrated member comprising a first distal end having a locking hook disposed on a vertically extending arm to engage the striker when in the engaged position and a secondary hood latch handle, a pivot mount by which secondary hood latch is pivotally attached to a front chassis member of the motor vehicle and about which the secondary hood latch pivots, and a second distal end upon which is disposed a vertically depending secondary hood latch release pawl operatively coupled with the controller; and a sensor operatively coupled with the hood that provides a signal to the controller when the hood has been lifted to the open condition;

wherein the controller actuates the secondary hood latch to the disengaged position for a prescribed period of time by displacement of the vertically depending secondary hood latch release pawl upon receiving the system input signal from the vehicle system input device, thereby allowing the hood to be raised to the open condition, after which the controller actuates the secondary hood latch to the engaged position after the earlier of the prescribed period of time or the sensor providing a signal to a controller that the hood has been lifted to the open condition; and wherein the secondary hood latch handle is adapted to actuate the secondary hood latch to the disengaged position by displacement of the secondary hood latch handle as a failsafe alternative to actuation by the controller.

18. The motor vehicle secondary hood latch release control system of claim 17, wherein the controller for a secondary hood latch control circuit comprises an integrated circuit configured to receive a trigger input from the vehicle system input device and generate an output pulse having an output pulse width corresponding to the prescribed period of time, and wherein the output pulse actuates the remote secondary hood latch release device.

19. The motor vehicle secondary hood latch release control system of claim 18, wherein the remote secondary hood latch release device is a solenoid mounted to a motor vehicle chassis, the solenoid comprising an actuator operatively coupled with the secondary hood latch to displace the secondary hood latch from the engaged position to the disengaged position.

\* \* \* \* \*

UNITED STATES PATENT AND TRADEMARK OFFICE
CERTIFICATE OF CORRECTION

| | | |
|---|---|---|
| PATENT NO. | : 10,808,436 B2 | Page 1 of 1 |
| APPLICATION NO. | : 15/263738 | |
| DATED | : October 20, 2020 | |
| INVENTOR(S) | : Cuddihy et al. | |

It is certified that error appears in the above-identified patent and that said Letters Patent is hereby corrected as shown below:

In the Claims

Column 13;
Claim 1, Line 38:
"adapted the" should be --adapted to--.
Claim 1, Line 39:
"good" should be --hood--.

Column 16;
Claim 18, Line 18:
"a" should be --the--.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*